Dec. 7, 1937.  L. S. CHILCOTT  2,101,491
FISHHOOK
Filed April 30, 1936
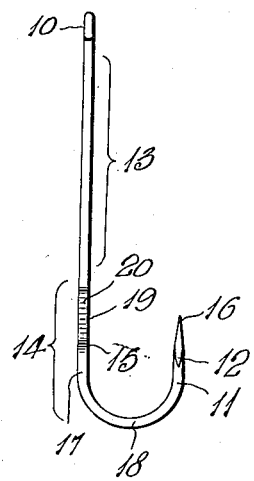
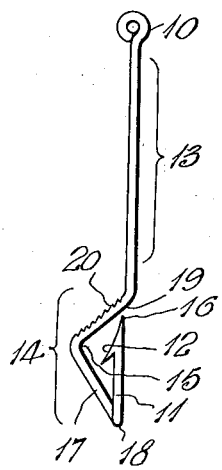
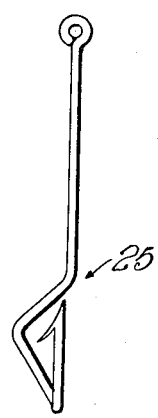
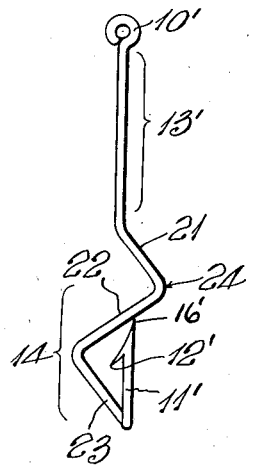
Inventor
Langdon S. Chilcott
By H. B. Willson &Co
Attorneys Patented Dec. 7, 1937

2,101,491

UNITED STATES PATENT OFFICE 2,101,491

FISHHOOK

Langdon S. Chilcott, Brewer, Maine

Application April 30, 1936, Serial No. 77,229

1 Claim. (Cl. 43—27)

The invention aims to provide a new and improved fish hook which will, in the great majority of cases, securely embed in either the upper or lower part of the fish's mouth instead of slipping "flatwise" out of the mouth as often occurs with conventional hooks.

A further aim is to provide an improved hook having the above function and also that of preventing the bait from sliding from the hook proper onto the hook shank.

With the foregoing in view, the invention resides in the novel subject matter hereinafter described and claimed, description being accomplished by reference to the accompanying drawing.

Figs. 1 and 2 are side elevations at right angles to each other showing one form of the improved hook.

Figs. 3 and 4 are side elevations at right angles to each other showing a different form of construction.

Fig. 5 is a view similar to Fig. 2 but showing a slight variation over the hook disclosed in Figs. 1 and 2.

The hook shown in Figs. 1 and 2 is bent from a single piece of wire and is provided at one end of the hook shank with an eye 10 or other means for attaching a line, while the wire at the other end of the hook is bent to form a return-bend hook 11 having a barb 12. The major portion 13 of the hook shank is straight and a restricted portion of said shank adjacent the hook 11, is bent obliquely in one direction and then obliquely in the other direction to provide a V-formation 14, this V-formation being disposed in a longitudinal plane substantially at right angles to the longitudinal plane in which the hook 11 is located. The crotch 15 of the formation 14 is substantially opposite the point 16 of the hook 11, the lower arm 17 of said V-formation extends substantially to the bight portion 18 of said hook 11, and the upper arm 19 of said formation extends directly to the lower end of the straight shank portion 13. The upper side of this arm 19 is preferably roughened as shown at 20.

It will be observed that the parts are so proportioned that the fish may take the entire hook 11 and the open V-formation 14 into his mouth and close his jaws upon the upper portion 13 of the shank, with his pin-like teeth closed upon said shank portion. In the great majority of cases, when the hook is taken into the mouth, the hook 11 lies flat therein, that is, in a plane substantially parallel with the fish's upper and lower jaws, and if it were not for the V-formation 14, the fisherman's pull on the line when receiving the bite, would often pull the hook out of the mouth or merely cause it to hook into the soft tissue at one side of the mouth, with danger of tearing out before "landing" the fish. The V-formation 14, however, prevents such occurrences to a large extent, by turning the hook during its forward sliding when the line is pulled, until the hook 11 is positioned either upwardly or downwardly, thereby causing said hook 11 to solidly hook into the hard tissue of one or the other of the jaws. With the hook 11 lying horizontally between the jaws, the V-formation 14 projects either upwardly or downwardly and in this position, cannot slide directly out of the fish's mouth between the closed toothed jaws when the line is pulled, the result being that said formation "takes the course of least resistance" and turns until it is horizontal and can slide forwardly. In so turning, the V-formation 14 turns the hook 11 either upwardly or downwardly in position to hook into the hard tissue. When the roughening means 20 is used, it increases the resistance to the forward sliding of the V-formation 14 and increases the tendency of said formation to turn and "take the course of least resistance".

The hook shown in Figs. 3 and 4 is formed from a single piece of wire, the hook shank being provided with an eye or the like 10' at one end for attachment to the line while the other end of the shank is provided with a return bend hook 11' having a barb 12'. The major portion 13' of the hook shank is straight but the wire at the lower end of this straight portion is bent obliquely in one direction as at 21, is then bent obliquely in the opposite direction as at 22, is then again bent obliquely in said one direction as at 23, and is finally bent to form the hook 11'. The bent portions 21, 22 and 23 are disposed in a longitudinal plane substantially at right angles to the plane of the hook 11' and it will be seen that the portions 22 and 23 impart a V-formation to the lower end of the shank, said V-formation being denoted at 14'. The zig-zag formation into which the wire is bent in Figs. 3 and 4 also provides the hook shank with another V-formation 24 extending in the opposite direction from the formation 14', and these two formations coact to turn the hook to an effective position should there be any tendency of it to slide "flatwise" out of the fish's mouth. In Figs. 1 and 2, the point 16 is shown slightly above the crotch 15 of the V-formation 14 and in Figs. 3 and 4, the point 16' is shown slightly below the crotch of the V-formation 24, the point in both instances however, being substantially opposite the crotch.

The hook disclosed as 25 (Fig. 5) is identical with the hook shown in Figs. 1 and 2 except that the teeth or roughening means 20 are omitted.

It will be seen from the foregoing that I have provided a simple and inexpensive, yet an efficient fish hook which insures more success than when using conventional hooks, and it will be observed that the V-formation of the hook shank will not only perform the function above explained, which is its primary function, but will act also to prevent slipping of the bait from the hook proper onto the hook shank.

Preferably, though not necessarily, the barb of the hook (12 or 12') is disposed at one of the lateral sides of said hook instead of at the inner side thereof, as customary, it having been found that this feature also adds to the efficiency of the hook.

I claim:—

In a fish hook, a single wire having one of its extremities provided with line-attaching means and having its other extremity bent to form a return-bend hook, the single reach of said wire between said line-attaching means and said return-bend hook constituting a shank the lower portion of which is bent obliquely in one direction and then obliquely in the other direction, providing a V-formation whose upper and lower arms extend above and below the hook point respectively, disposing the crotch of the V substantially opposite said hook point, said V-formation being disposed in a plane at substantially right angles to the plane of said return-bend hook and having both its upper and lower arms laterally unobstructed in all directions, the portion of said shank between said V-formation and said line-attaching means being longer than the vertical width of said V-formation, being straight, being substantially unidirectional with the pointed end of said return-bend hook and being laterally unobstructed in all directions, said V-formation and said straight shank portion being so proportioned with respect to said return-bend hook that the fish may take said return-bend hook, said V-formation and part of said straight shank portion into his mouth and close his jaws upon said straight shank portion, whereby when a pull on the line causes longitudinal sliding movement of said straight shank portion between the fish's closed jaws with the return-bend hook lying in a plane substantially parallel with said jaws, said V-formation will abut one of said jaws and turn the entire hook to jaw-penetrating position as said V-formation slides outwardly between said jaws.

LANGDON S. CHILCOTT.